Nov. 29, 1949  B. A. RICCIO  2,489,434
BRAKE SPRING EXTRACTOR
Filed Dec. 30, 1946   2 Sheets-Sheet 1
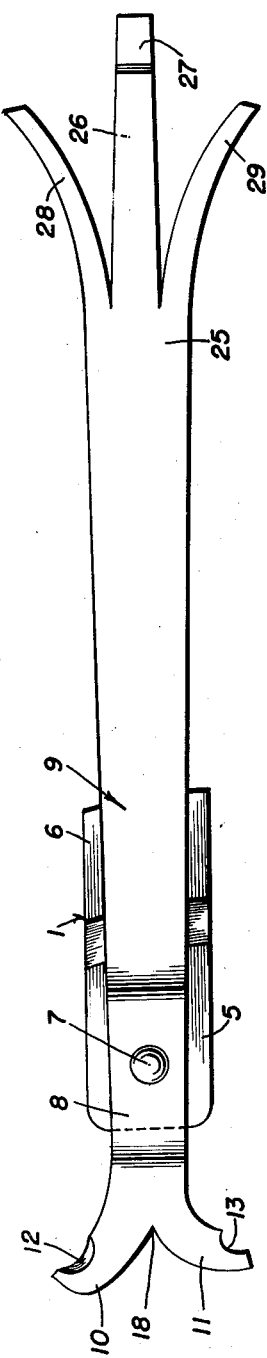
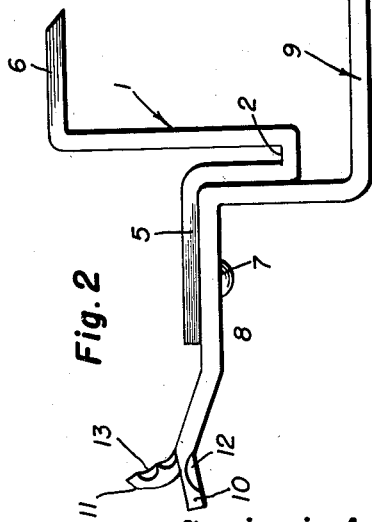
Inventor
Benjamin A. Riccio
By Clarence A. O'Brien
and Harvey B. Jacobson
Attorneys Inventor
Benjamin A. Riccio Patented Nov. 29, 1949

2,489,434

UNITED STATES PATENT OFFICE 2,489,434

BRAKE SPRING EXTRACTOR

Benjamin A. Riccio, South Norwalk, Conn.

Application December 30, 1946, Serial No. 719,171

2 Claims. (Cl. 29—227)

This invention relates to improvements in brake spring extractors.

An object of the invention is to provide an improved center line brake spring extractor which will remove and replace brake springs quickly and with ease from a center line pull by means of a snap-on clip bracket and a co-operating pivoted lever bar formed with right hand and left hand terminal hooks at one extremity of said lever.

Another object of the invention is to provide an improved form of brake spring extractor which will comprise a U-shaped bracket clip adapted to slip over the edge of a brake shoe and its lining, and a forked lever bar whereby the tensioning and retaining springs for either two or three shoe type brakes may be efficiently removed and replaced.

A further object of the invention is to provide an improved brake spring extractor of integral construction for removing and replacing brake shoe tensioning and retaining springs, said extractor being positive in operation and relatively inexpensive to manufacture and produce.

Other objects will appear as the description proceeds.

In the accompanying drawings which form part of this application—

Figure 1 is a top plan view of the improved brake spring extractor and the supporting clip therefor;

Figure 2 is a side elevation of the improved brake spring extractor and the supporting clip therefor.

Like characters of reference are used throughout the following specification and the accompanying drawings to designate corresponding parts.

Figure 3:
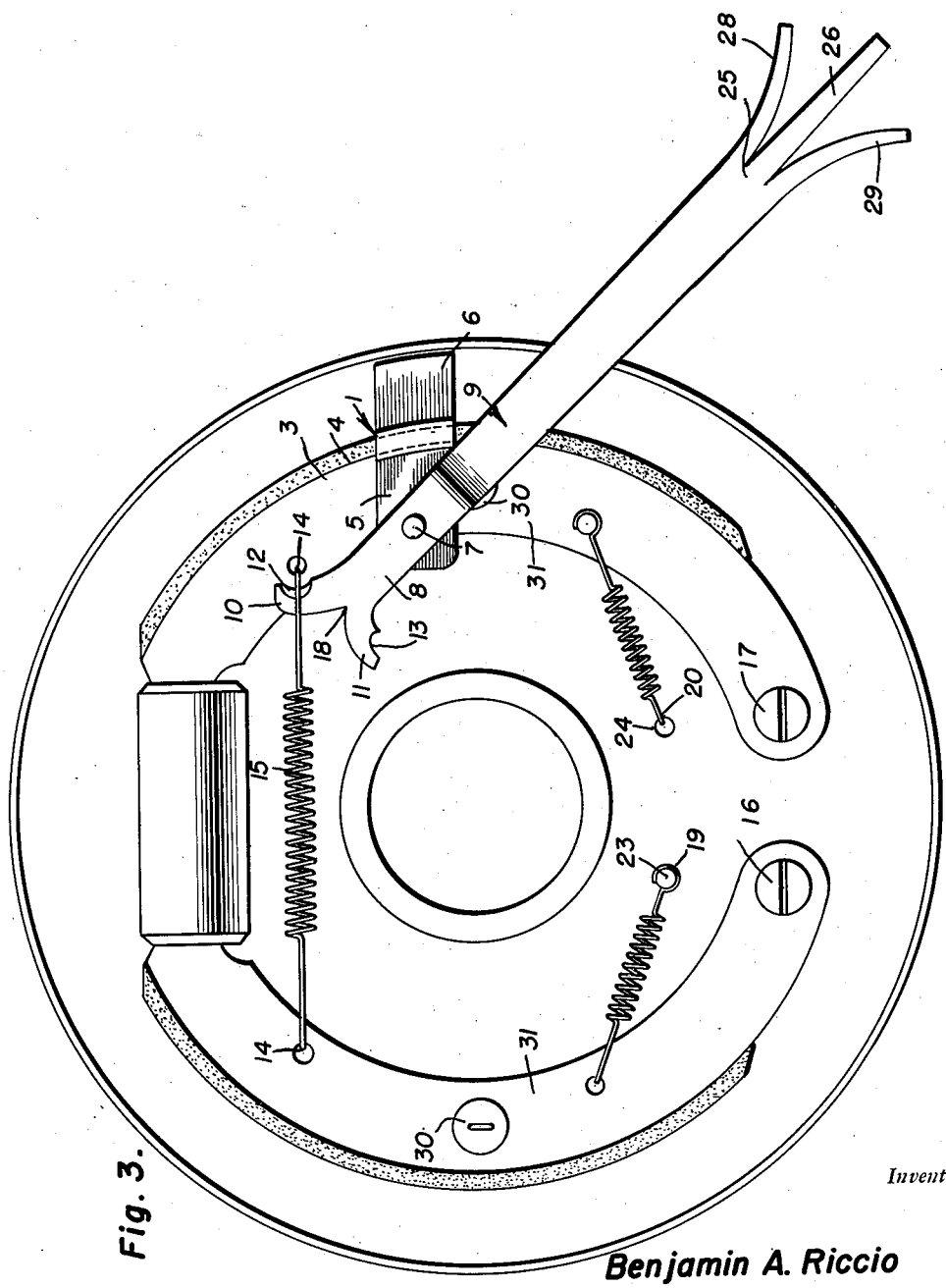
Figure 3 is a front elevation of a hydraulic two shoe brake assembly showing the improved brake spring extractor disposed over the edge of one of the brake shoes and its lining in position to remove one end of the upper coil spring connected between the upper ends of said brake shoes.

In carrying out the invention, there is provided an improved brake spring extractor having a supporting bracket clip generally designated by the reference numeral 1, being formed with U-shaped attaching slot 2 for positioning over the edge of a brake shoe 3 and its lining 4.

The bracket clip 1 will be also formed with the oppositely extending arms 5 and 6 disposed on different levels.

The bracket arm 5 supports the pivot rivet 7 upon which the right angularly bent shorter end 8 of the lever bar 9 is pivotally mounted, lying in parallel relation thereto.

The shorter end 8 of the lever bar 9 is offset adjacent its end and terminates in the downwardly and upwardly extending fingers 10 and 11 formed with the arcuate oppositely disposed dished notches 12 and 13, respectively for removing the spring eyes 14 of the springs 15 used for holding the upper ends of the brake shoes in position when disposed over the lower end studs 16 and 17.

A fork or crotch 18 is formed between the fingers 10 and 11, and will be used to slip the spring eyes 19 and 20 of the springs 21 and 22 from their supporting posts 23 and 24.

The lever 9 is formed with a long end 25 which terminates in a central finger 26 in which a half raised inversion or seat 27 is formed in the underside or bottom thereof, being used to pry off the springs from the said posts 23 and 24 and also replace said springs.

A pair of downwardly and outwardly extending integrally formed arcuate fingers 28 and 29 are disposed at either side of said central finger 26, and are used for receiving the securing caps 30 while turning them to remove or replace them before or after the brake shoes have been replaced.

From the foregoing description, it will be apparent that there has been devised and provided a highly efficient form of center line brake spring extractor which when the back clip 1 has been positioned over an edge of a brake shoe and its lining, the center line pull on the lever bar will prevent slipping of the brake spring extractor which would possibly result in injury to the operator or mechanic or to the brake lining.

While the preferred embodiment of the instant invention has been illustrated and described, it will be understood that it is not intended to limit the scope of the invention thereto, as many minor changes in detail of construction may be resorted to without departure from the spirit of the invention.

Having thus described my invention, what I claim as new and desire to secure by Letters Patent of the United States is:

1. A brake spring extracting tool comprising a lever having a right angularly bent shorter end, an arcuate finger projecting laterally from the shorter end of the lever and having an outer edge, the outer edge of said finger having a concaved recess therein, and means for detachably securing the lever relative to a brake lining, said means including a channel member having a web portion and spaced parallel first and second leg portion connected to the web portion, the first and second leg portions of said channel member being spaced sufficiently to receive a brake lining, the second leg portion of said channel member being elongated and extending a greater distance from the web portion of said channel member than the first leg portion of said channel member, said first and second leg portions having outer ends and inner and outer surfaces, a first bearing arm integrally formed with the outer end of said second leg portion and disposed perpendicular to the second leg portion, said first bearing arm projecting outwardly from the outer face of said second leg portion, a second bearing arm integrally formed with the outer end portion of said first leg portion and disposed perpendicular to the first leg portion, said second bearing arm projecting outwardly from the outer face of said first leg portion, said first and second bearing arms being spaced parallel to each other and to the web portion of said channel member, and means pivoting the right angularly bent shorter end of said lever to the second bearing arm.

2. The combination of claim 1, wherein the first and second leg portions of said channel member are transversely curved to conform to the inner and outer peripheries of a brake lining.

BENJAMIN A. RICCIO.

REFERENCES CITED

The following references are of record in the file of this patent:

UNITED STATES PATENTS

| Number | Name | Date |
|---|---|---|
| 438,710 | Painter | Oct. 21, 1890 |
| 687,214 | Entrekin | Nov. 26, 1901 |
| 2,042,287 | Allievi et al. | May 26, 1936 |
| 2,441,696 | Feingold | May 18, 1948 |